United States Patent
Beach

Patent Number: 5,492,249
Date of Patent: Feb. 20, 1996

[54] APPARATUS TO VENT HIGH-PRESSURE AIR TO ATMOSPHERE IN A FROZEN CONFECTION-DISPENSING APPARATUS

[75] Inventor: William H. Beach, Floyds Knobs, Ind.

[73] Assignee: Grand Soft Equipment Company, Louisville, Ky.

[21] Appl. No.: 203,444

[22] Filed: Feb. 28, 1994

[51] Int. Cl.$^6$ .................................................. B65D 35/54
[52] U.S. Cl. ........................... 222/96; 222/105; 222/137; 222/146.6; 222/326; 222/387; 222/389; 222/397; 222/399
[58] Field of Search .............................. 222/94, 95, 96, 222/105, 137, 146.6, 326, 387, 389, 397, 399

[56] References Cited

U.S. PATENT DOCUMENTS

| | | | |
|---|---|---|---|
| 4,765,509 | 8/1988 | Eisenhut et al. | 222/389 X |
| 4,911,328 | 3/1990 | Keller | 222/389 X |
| 5,150,820 | 9/1992 | McGill | 222/95 |
| 5,265,764 | 11/1993 | Rowe et al. | 222/95 |
| 5,361,941 | 11/1994 | Parekh et al. | 222/105 X |
| 5,368,195 | 11/1994 | Pleet et al. | 222/105 X |

*Primary Examiner*—Andres Kashnikow
*Assistant Examiner*—Joseph A. Kaufman
*Attorney, Agent, or Firm*—Dorr, Carson, Sloan & Birney

[57] ABSTRACT

A frozen dessert dispensing apparatus is comprised of a housing that receives at least one collapsible container for a frozen dessert wherein the collapsible container is provided with at least one opening for dispensing frozen dessert therefrom. A dispensing valve assembly is in flow communication with the at least one opening. Air pressure is utilized to collapse the collapsible container in response to the operation of the dispensing valve. The housing is provided with a door which is utilized for placing the collapsible containers in the housing as well for removal of the collapsed container from the apparatus. A safety device is provided so that collapsible containers cannot be removed from the apparatus until the air pressure on the collapsible container is vented.

9 Claims, 8 Drawing Sheets

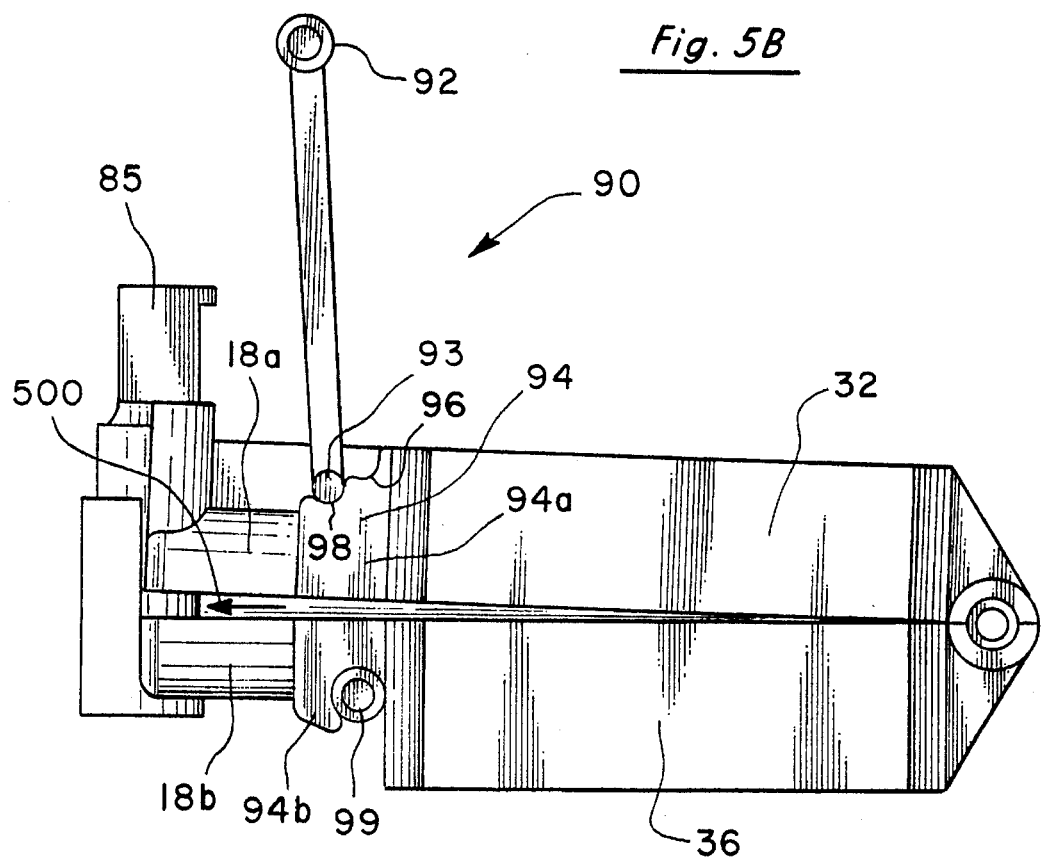
Fig. 5B
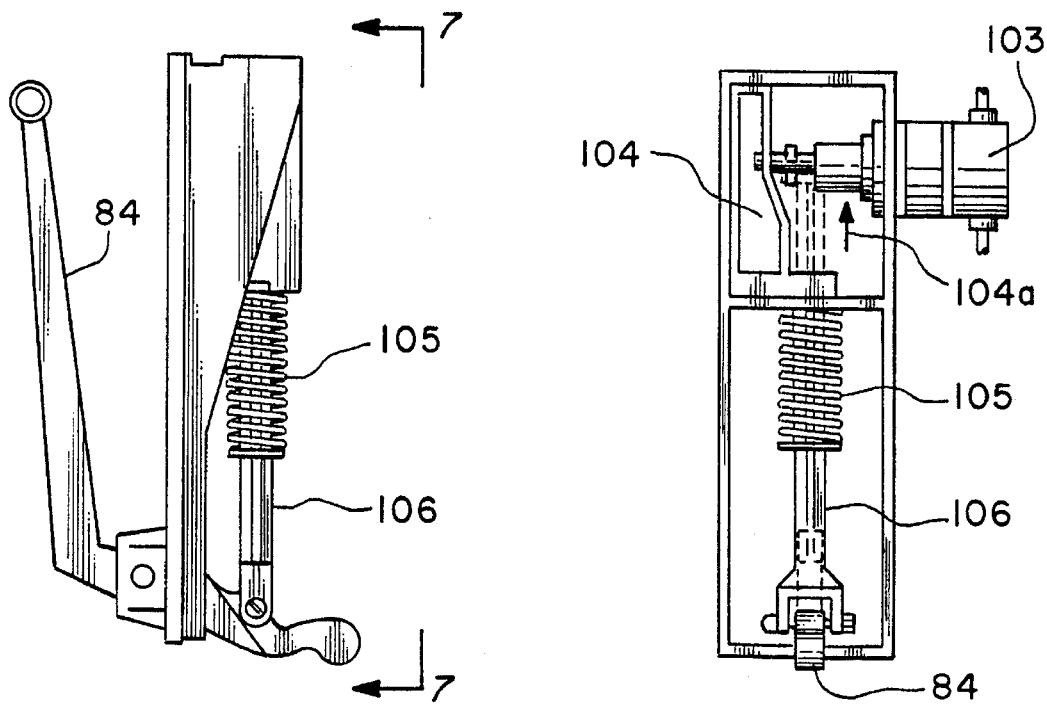
Fig. 6
Fig. 7

5,492,249

APPARATUS TO VENT HIGH-PRESSURE AIR TO ATMOSPHERE IN A FROZEN CONFECTION-DISPENSING APPARATUS

BACKGROUND OF INVENTION

The present invention relates to a frozen confection dispensing apparatus. Furthermore, the present invention relates to a system for safe removal of an empty collapsible container in a frozen confection dispensing apparatus.

When a frozen confection dispensing apparatus as described in U.S. Pat. No. 5,048,734 is being operated, air pressure is used to extrude a frozen confection through a discharge tube (dispensing spigot) by compressing or collapsing a collapsible container in which the confection is held. The means for supplying air pressure is generally an air compressor in series with a manual air valve that allows pressurized air via a nozzle into a closed compartment (pneumatic cylinder) that contains a piston, the collapsible container holding the frozen confection, and a valvable discharge tube including a spigot and plunger.

In normal operation, the closed compartment is pressurized with air from about 10 to 60 psi. This pressure is well within the safe working limits of the apparatus during product discharge as well as the periods between product dispensing. However, to change a collapsible container when it becomes empty or to work on or to inspect the interior of the closed compartment, the pressurized air in the closed compartment must first be vented to atmosphere. This is necessary to prevent the possible rapid expansion of air that would result from opening the closed compartment while still pressurized above atmospheric pressure.

In prior art teachings, for example, the opening of the closed compartment was facilitated by closing a manual air valve situated in the air line between the air compressor and the closed compartment which cut off the high pressure air means to the closed compartment. To relieve the pressure above atmospheric pressure contained in the closed compartment, the closed compartment would then have to be tilted forward by means of a supplied mechanical pivot mechanism effectively disconnecting the closed compartment from the nozzle of the high pressure air means and venting all the high pressure air contained in the closed compartment to atmosphere via the opening left by the displaced nozzle. This allowed safe opening of the closed compartment to change a collapsible container or to inspect the interior of the closed compartment.

The major fault of this system was that operators having this duty to change a collapsible container, or those interested in inspection of the interior of the closed compartment, would from time to time neglect to pull the closed compartments forward to vent the system, thus failing to relieve the high pressure air down to atmospheric pressure. This action often resulted in product losses resulting in excessive cleanup and repair.

This invention solves the problems encountered in prior art apparatuses and provides for a system and method to automatically relieve the high pressure contained in the closed compartment when the closed compartment is opened.

SUMMARY OF THE INVENTION

It is an object of the present invention to provide a system to vent high pressure air to atmosphere in a frozen confection dispensing apparatus. It is another object of the present invention to provide a system for depressurizing a pressurized compartment of a frozen confection dispensing apparatus containing a collapsible container for frozen confection. It is a further object of the present invention to provide a system which allows for the safe removal of a collapsible container from a frozen confection dispensing apparatus when the collapsible container has been under pressure prior to removal of said collapsible container.

More particularly, the present invention relates to a frozen dessert dispensing apparatus comprising: a housing having means to receive at least one collapsible container for a frozen dessert, said container having at least one opening for dispensing frozen dessert therefrom; a dispensing valve means in flow communication with said at least one opening; air pressure means to collapse said at least one collapsible container in response to operation of said valve means; and, means to prevent removal of said collapsible container until all pressure on said collapsible container is depleted.

BRIEF DESCRIPTION OF THE DRAWINGS

FIG. 5B is a side view of the safety latch device of FIG. 5 in an open, safety latched position;

FIG. 6 is an enlarged side view of a dispensing assembly of the present invention;

FIG. 7 is a front view of FIG. 6;

DETAILED DESCRIPTION OF THE PREFERRED EMBODIMENT

1. Overview.

Figure 1:
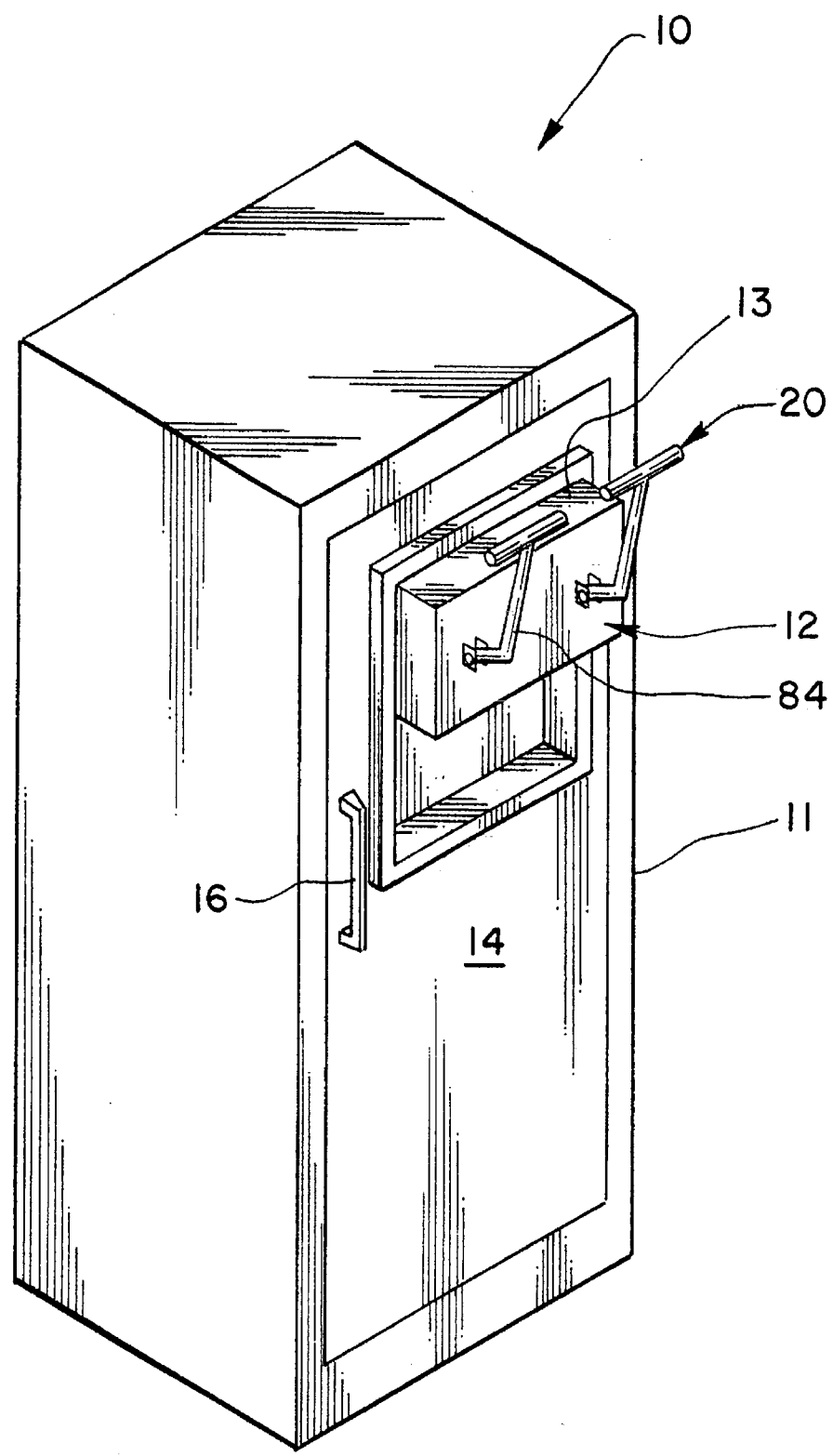
FIG. 1 shows an exterior view of the frozen confection dispensing apparatus according to the present invention.

FIG. 1 shows a frozen confection dispensing apparatus 10 of the present invention with an outer casing 11. A dispensing section 12 having a conduit casing 13 extends through a container door 14 of the apparatus 10. Extending outward from the conduit casing 13 are two valves 20 operably responsive to valve handles 84. Even though two dispensing valves 20 are shown, it is realized that the dispensing apparatus 10 of the present invention may include one or a number of dispensing valves 20 depending on the design of the unit. The dispensing valves 20 are linearly aligned at each interval across the conduit casing 13. Each dispensing valve 20 is disposed for controlling the flow of product from each collapsible container 22 in FIG. 2. The valve 20 excepting its handle 84 is disposed within the dispensing section 12 so that the valve 20 is in the refrigerated portion of the apparatus thereby maintaining any frozen dessert therein in a frozen or near frozen condition at all times prior to dispensing. Access to the interior of the apparatus 10 is aided by the use of a door handle 16.

The outer casing 11 of the apparatus 10 is ideally insulated to reduce heat transfer from the exterior environment to the interior of the apparatus 10. The interior temperature of the apparatus 10 should ideally be maintained within a preselected temperature range generally sufficient to keep frozen confection in a condition that it can be easily extruded from the collapsible bag or container. The preselected temperature will generally be in the range of from 10° F. to about 12° F., but may be lower or higher depending on the physical properties of the frozen dessert being dispensed. When the dispensing apparatus 10 is properly insulated, only a small freezing unit is needed to adequately compensate for heat gained from the exterior environment acquired from the outer casing 11 and the opening of the container door 14. Moreover, appropriate refrigeration means, which are well known in the art, are in use within the interior of the dispensing apparatus 10 to maintain the temperature in the preselected range.

Figure 2:
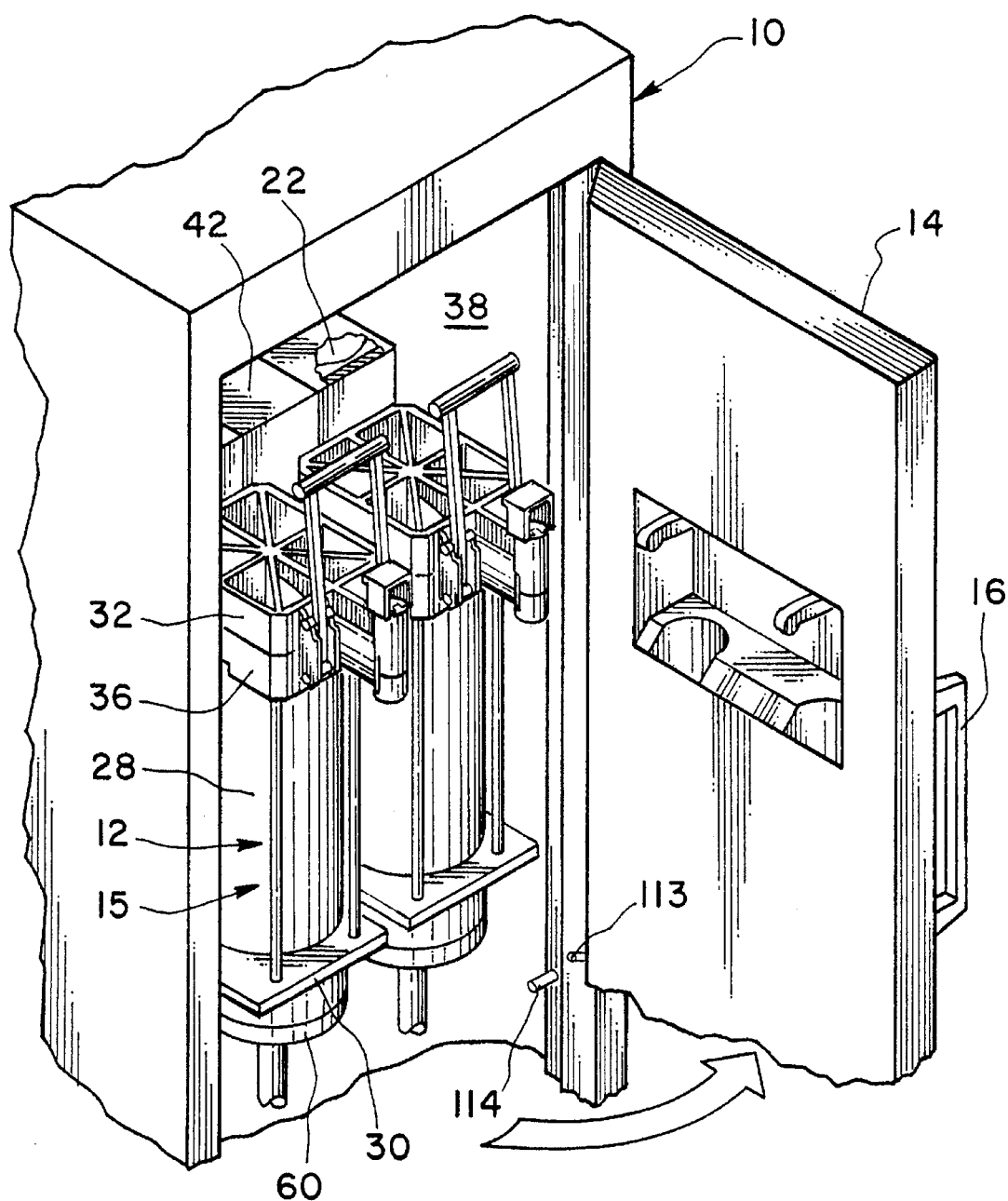
FIG. 2 is a partial interior view of the dispensing section and shows the receptacle for a collapsible container of the present invention.

FIG. 2 is a partial interior view of the dispensing apparatus 10. The container door 14 is open to reveal storage area 38 which contains multiple replacement collapsible containers 22 collected together into a transport package 42. The transport package 42 is generally constructed of a thermally insulated material.

Generally, frozen dessert or confection is bagged in a collapsible container 22, collected with other similar units in a transport package 42 and shipped in a hard frozen state at generally sub-zero degrees Fahrenheit. The transport package 42, containing the frozen confection, is placed in the storage area 38 where it is allowed to slowly thaw to the preselected dispensing temperature range. After the frozen confection has been tempered and the temperature has been brought to the preselected temperature or tempered, the temperature of the confection is maintained at this level to prevent localized melting and refreezing which could result in an unappetizing crystallization of the soft-serve frozen confection.

The dispensing section 12 includes a plurality of dispensing assemblies 15, only two being shown. Each dispensing assembly 15 includes a receptacle 28 for receiving the collapsible container 22 therein. The receptacles 28 are elongated sleeves generally made of stainless steel, fiberglass or the like, with openings in each end thereof. The top opening is the opening to receive the collapsible container 22 therein, and the bottom opening, or second opening, receives the piston 60 therein.

A receptacle support plate 30 is mounted in the interior of the dispensing section 12 for holding the receptacle 28 thereon. The receptacle support plate 30 has an opening therethrough of substantially the same diameter as the inside diameter of the receptacle 28 and the circumferential diameter of the piston 60 so as to receive the piston 60 therethrough. Receptacle 28, support plate 30, and piston 60 define a closed compartment for collapsible container 22.

2. Details of Receptacle 28.

Figure 9:
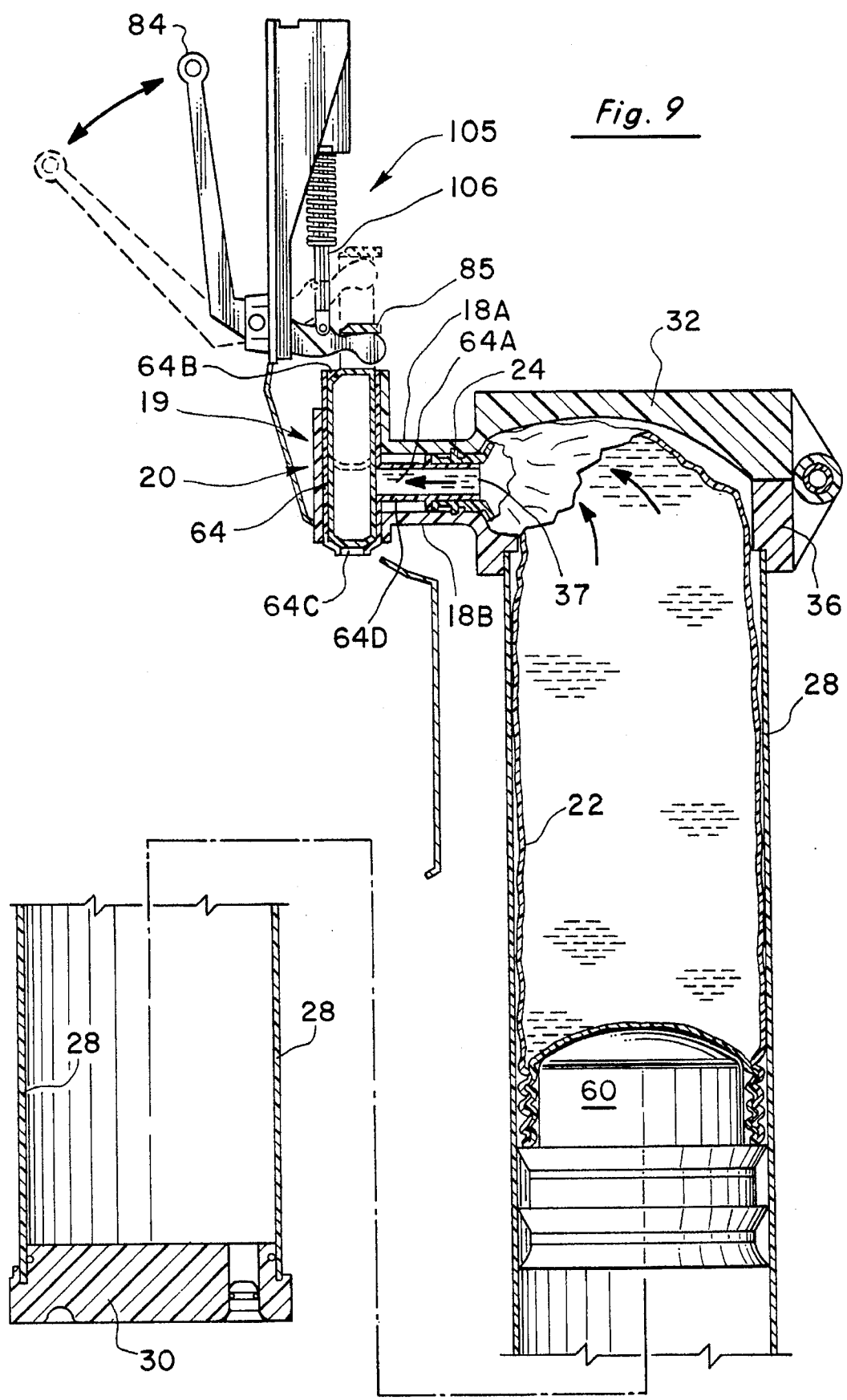

As best shown in FIG. 9, the collapsible container 22 is held in place in the receptacle 28 during use by a pressure lid assembly. The pressure lid assembly includes a pressure lid 32 and a pressure lid mount plate 36. The mount plate 36 is provided with a centrally disposed opening 37 therein that receives the discharge end of the collapsible container 22. The pressure lid 32 in combination with the pressure lid mount plate 36 are provided with semi-circular outwardly extending conduit portions 18a and 18b, which together form a T-shaped dispensing conduit that receives the collapsible container outlet 24 therein. The T-shaped dispensing conduit 18a, 18b also receives the T-shaped spigot 64 therein. T-shaped spigot 64 is provided with a cylindrical hollow inlet leg portion 64d that is disposed within the dispensing section 12. An opening 64a is in flow communication with the collapsible container outlet 24, preferably with the collapsible container outlet 24 being received within the inlet opening 64a in sealing relationship therewith.

The spigot 64 is also provided with a cylindrical hollow head portion in flow communication with and transverse to leg 64d. An opening 64b is disposed at one end of said head portion to receive a vertical action plunger 85 therein. Plunger 85 may be solid, but a preferred plunger 85 has a hollow core. The frozen confection or dessert that flows out of the collapsible container outlet 24 through leg portion 64d is blockable from the head portion of spigot 64 by the vertical action plunger 85. The manual lever 84 is attached to the plunger 85 whereby movement of lever 84 causes plunger 85 to be movable in and out of the spigot 64 to allow dispensing of the soft serve frozen confection. As shown in FIG. 9, the manual lever 84 can be actuated so that the plunger 85 raises (shown in dotted lines) above the leg portion 64d to allow dispensing of the frozen confection or lowered to a horizontal position (shown in solid lines) below the leg portion 64d blocking flow of the confection through the spigot 64.

Generally, the handle 84 is in actuating relationship with piston 60 through an air pressure system, to be discussed hereafter, so that upon handle 84 being actuated to a preselected position the piston 60 is actuated and engages the bottom of the collapsible container 22 forcing the confection out of the collapsible container 22 through the collapsible container outlet 24. Upon releasing the handle 84, the piston 60 is disengaged and the movement of the piston for engaging with the collapsible container 22 is therefore stopped and the plunger 85 blocks the flow of the soft serve confection through the spigot 64. In a preferred embodiment piston 60 is operable in response to a variable pressure source 110 in FIG. 3 so that as the handle 84 is raised, additional pressure is applied to the collapsible container 22 through piston 60.

3. Regulation of High Pressure Air.

Figure 3:
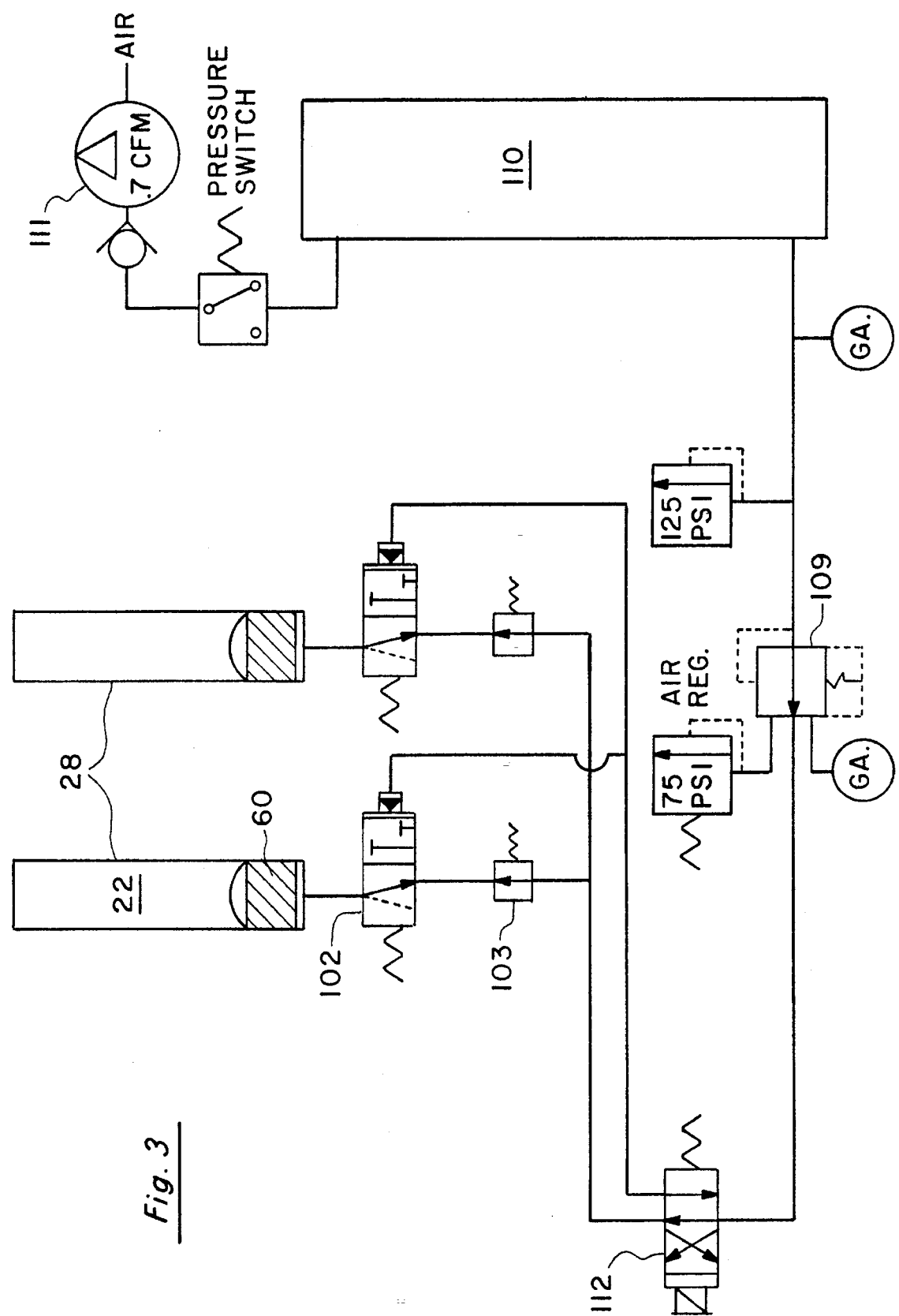
FIG. 3 is a schematic view of a high pressure air system and the electrical elements for operating the high pressure air system of the present invention.

With reference to FIG. 3, an air compressor 111, air storage tank 110 and main air regulator 109 are provided for supplying and regulating the flow of high pressure air to the piston 60 of the frozen dessert dispensing apparatus 10 of the present invention.

Figure 8:
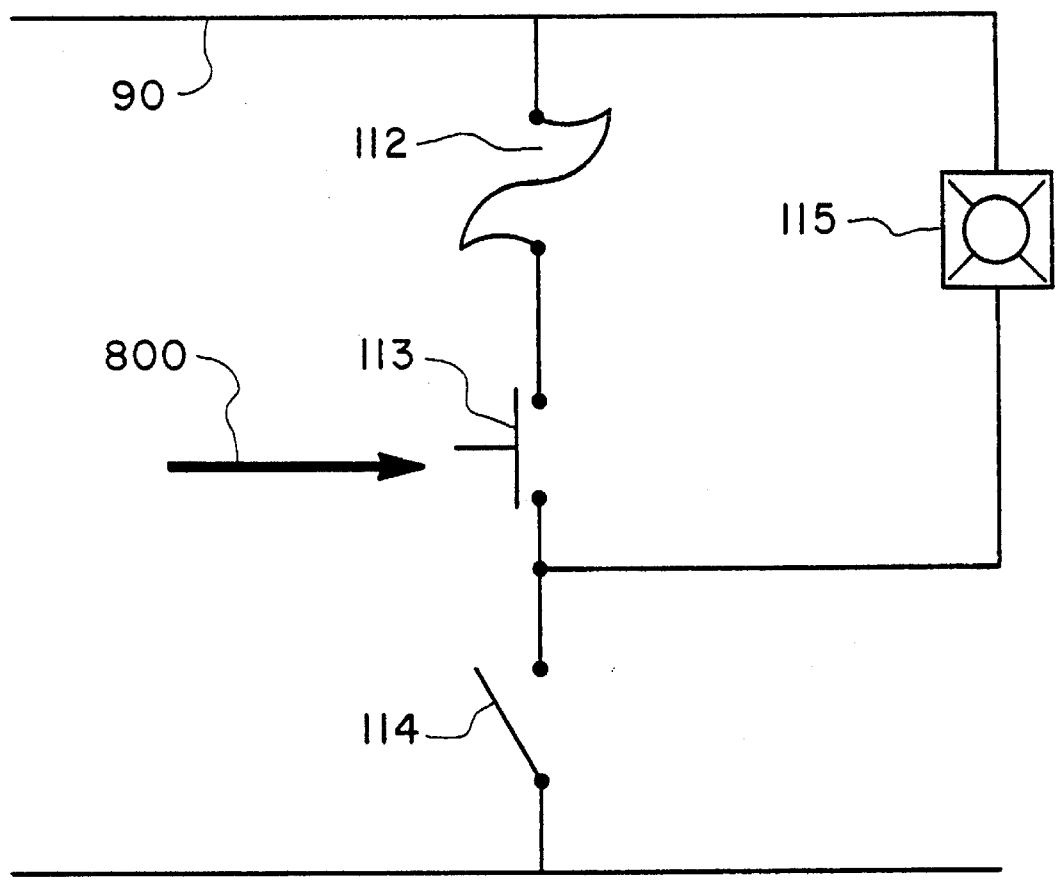
FIG. 8 is an electrical schematic for the apparatus of FIG. 1 showing the electrical connections for the high pressure air system; and FIG. is a partial cross-section of a receptacle, collapsible container and dispensing valve assembly of the present invention.

Moreover, in the electrical schematic in FIG. 8 a bifurcated air solenoid 112, door switch 113 and air lock-out switch 114 are provided for supplying electrical current to the frozen dessert dispensing apparatus 10 of the present invention. The electrical system as shown in FIG. 8 shows the connections of the electrical control elements of the present invention. More particularly, the operation of the electrical circuit 90 in FIG. 8 determines the air flow to the piston 60, which in turn applies force or pressure on the collapsible container 22. For example, when the door 14 (FIG. 2) of the frozen confection dispensing apparatus 10 is in its normally closed position, door 14 engages the door switch 113 to a closed position as shown by action of arrow 800 in FIG. 8. An air lock-out switch 114 shown as a toggle switch in FIG. 3 is in series with the door switch 113 and the air lock-out switch 114 is manually closed during the dispensing operation thereby completing the electrical circuit through bifurcated solenoid 112 and light fixture 115. As best shown in FIG. 3, this completed electrical circuit 90 energizes the bifurcated air solenoid valve 112 to open, allowing for the passage of air from source air compressor 111 through main air regulator 109, air regulator 103 and piloted air switch 102 thereby exerting force on piston 60 with high pressure air at a preselected air pressure set and regulated by the air regulator 103.

The pressure level of high pressure air on piston 60 is controlled by the position of the dispensing handle 84 as shown in FIGS. 6 and 7. When the dispensing handle 84 is fully closed, it is held in position by the downward force of spring 105 (FIG. 6). In this instance, the push rod 106 and sloped cam 104 are in a fully closed position. The level of high pressure air passing through the regulator valve 103 is preset to a minimum design value. Accordingly, high pressure air at this design level is supplied to piston 60 through the piloted air switch 102 (FIG. 3) and pressurizes the piston 60 to the preset design level. Pressurized frozen confectionery product stored in the collapsible container 22 in the receptacle 28 will not be dispensed through the valvable spigot 64 because it would be fully closed. Lowering the dispensing handle 84 actuates the push rod 106 which is moved upward forcing the sloped cam 104 past the regulator valve 103 pushing in the plunger therein which allows higher pressure air to pass through the valve 103, ultimately raising the pressure on the piston 60. At the same time the pressure is increasing by the action of the dispensing handle 84 raising the plunger 85 and allowing product to be discharged through opening 64c (FIG. 9). By raising the dispensing handle 84 even higher, the push rod 106 forces the sloped cam 104 in the direction of arrow 104a to open even further the regulator valve 103 thereby increasing the air pressure upon piston 60. Increasing the pressure on piston 60 increases the flow of product out of the container outlet 24 and through the spigot 64.

Figure 4:
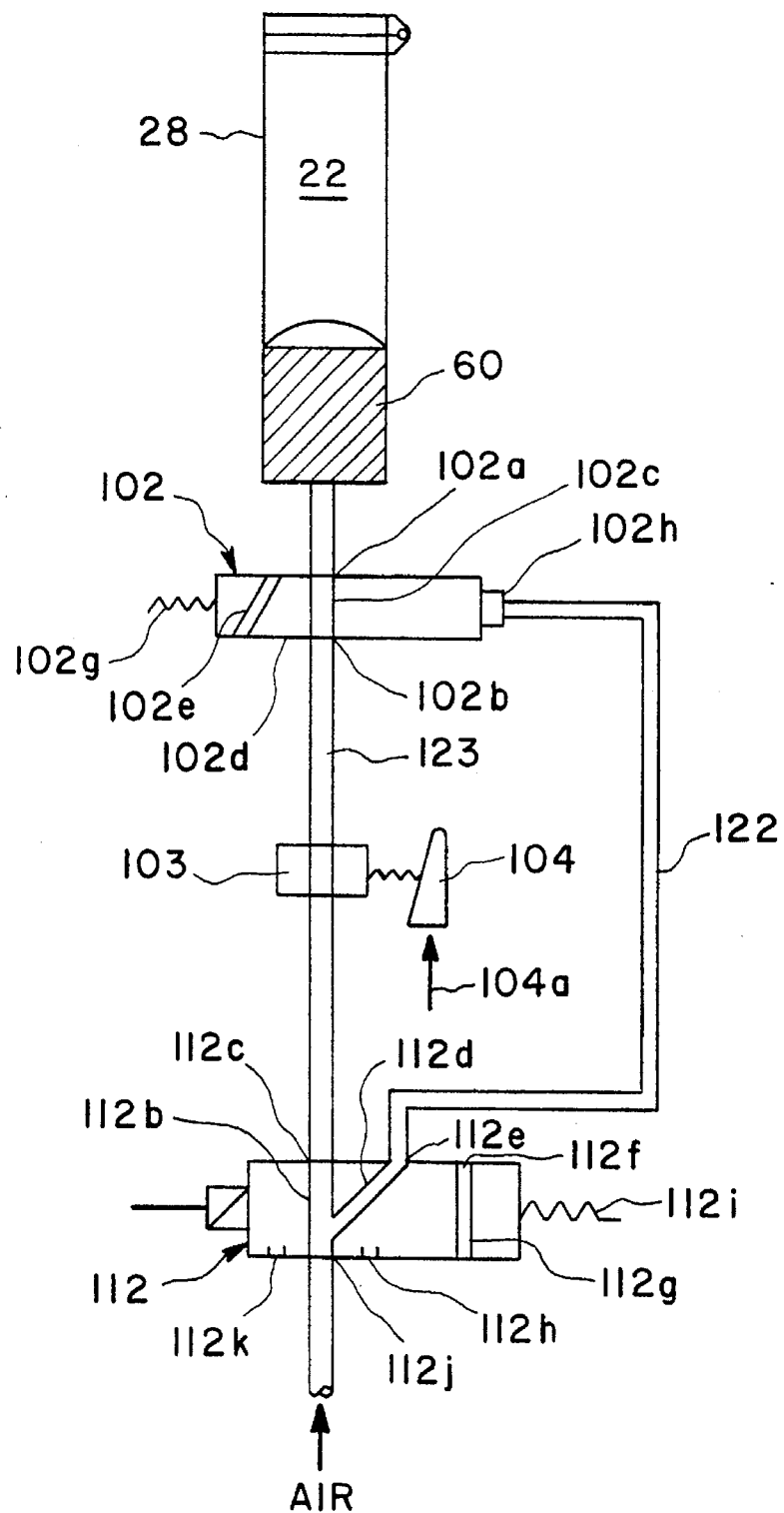
FIG. 4 is an enlarged plan view of one element of the present invention.

In FIG. 4 is shown the air flow for the operation or pressurization of the piston 60 as well as the depressurization of the piston 60. In normal operation when the door 14 is closed, the door switch 113 (FIG. 8) is closed and the toggle switch 114 (FIGS. 2 and 8) is also in a closed position, air is supplied to the solenoid valve 112. The solenoid valve 112 will then be in an open position enabling the flow of air through passageways 112b and 112d therein. The air flow through the passageway 112b exits through port 112c and in turn flows through the regulator 103 which is pressurized in response to the position of the slidable cam 104. Air flow through the air regulator 103 proceeds through the air piloted switch 102 which in a pressurized position aligns port 102b with the air flow line 102c, thereby providing flow means through the air passageway 102c and out through the port 102a. The port 102a is in flow communication with air piston 60.

The air piloted switch 102 is operable in response to pressure as indicated by the air pressure flowing from the regulator 112 through air passageway 112d, which is in flow communication with the conduit 122. Conduit 122 is in flow communication with the inlet port 102h for pressurizing the air piloted switch 102. As long as there is flow from the passageway 112d, then the air piloted switch will be in an open position for supplying air pressure to the piston 60.

When the door 14 is open, the door switch 113 is also open thereby cutting off electrical power to the bifurcated air solenoid valve 112. Likewise, manually operating switch 114 will also deactivate air solenoid valve 112. The air solenoid valve 112 will then be in a closed position thereby closing off or preventing flow out of the ports 112c and 112e. Passageway 112g will then be aligned with ports 112e and 112h thereby venting air in conduit 122 from the air piloted switch 102. Passageway 112d will be aligned with ports 112c and 112k to vent to atmosphere air from the system between solenoid 112 and air piloted switch 102. Upon release of the pressure from the air switch 102, the biasing means or spring means 102g forces the air piloted switch 102 into a closed position so that air passageway 102e is aligned with port 102a and port 102d thereby venting to atmosphere air from piston 60.

In operation, this invention employs the electrical switch 113 closed to the electrical current supplied to the apparatus, which electrical switch 113 is situated in the frozen confection dispensing apparatus in such a way as to be allowed to open or de-activate when the door 14 of the frozen confection dispensing apparatus 10 is opened (FIG. 2). This electrical switch 113 is the means by which electrical current is applied to actuate the bifurcated air solenoid 112.

The bifurcated air solenoid 112 normally supplies air to the frozen confection dispensing air regulator 103, which in turn supplies air to air-piloted air switches 102, which in their turn supply air to piston 60.

4. Details of Safety Latch Assembly

Figure 5:
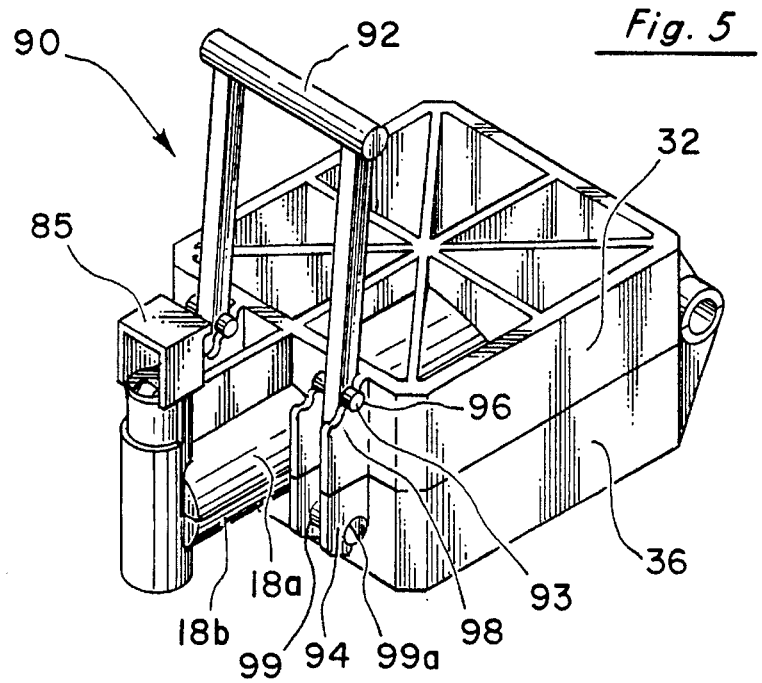
FIG. 5 is a perspective view of a safety latch device of the present invention.
Figure 5A:
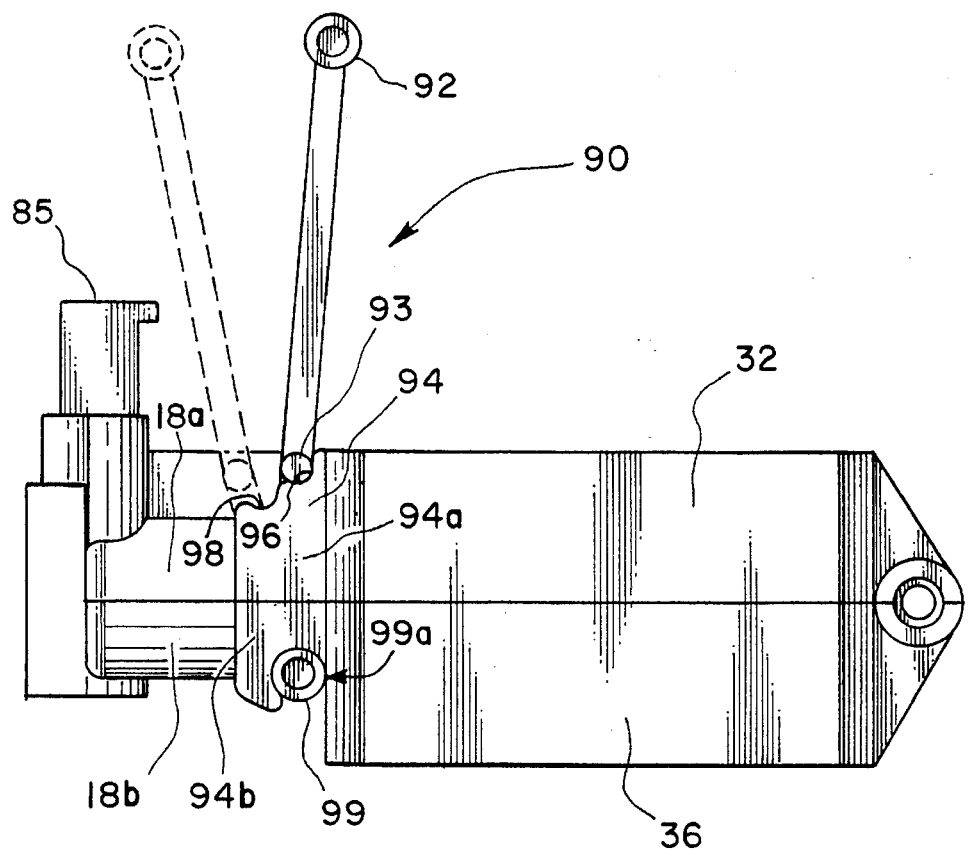
FIG. 5A is a side view of the safety latch device of FIG. 5 in a closed position.

As shown in FIGS. 5 and 5A, a pair of safety latch assemblies 90 are provided to prevent removal of a collapsible container 22 from the dispenser 28 as long as there is air pressure on piston 60. A safety latch assembly 90 includes at least one plate member 94 which is in two mating sections, 94a and 94b. The upper plate section 94a extends outwardly from the pressure lid 32 and the lower plate section extends outwardly from the pressure lid mount plate 36. The upper plate section 94a is provided with two grooves, an upper groove 96 and a lower groove 98, each groove configured to receive pin 93 therein. The depth of the upper groove 96 is less than the lower groove 98. The pin 93 is transverse to and unitary with the safety latch handle 92. And, in a normal closed position the pin 93 of the safety latch handle 92 is positioned or received within the groove 96.

The moveable handle 92 is secured to at least a pair of lower latch plate sections 94b, as shown in FIGS. 5, 5A and 5B. Plate sections 94b are disposed on opposite sides of the T-shaped dispensing conduit 18a, 18b. The groove 98 is provided so that when the safety latch handle 92 is moved downwardly, as shown in FIG. 5b, if air pressure is still on the piston 60, upon disengaging of the pin 93 from the groove 96, the pressure on the piston 60 will force the pressure lid 32 upwardly therefore engaging the latching pin 93 within the groove 98. Because of the greater depth of the groove 98 over groove 96, if there is pressure on the lid 32, the handle 92 cannot be pulled away from the plate lid 32 and any remaining pressure is vented as noted by the arrow identified by numeral 500. This prevents the plate lid 32 from being lifted away from receptacle 28 as shown in FIGS. 2 and 9. If there is no pressure on the lid 32, then the pin 93 clears the second groove 98 as shown by phantom lines in FIG. 5A.

Handle 92 is pivotally attached to the plate member 94 by transversely extending pin 99 which is received within aligned apertures 99a in parallel plate member 94.

5. Method of Operation.

In the first or normal operation condition, with the door 14 to the frozen confection dispensing apparatus 10 closed, the switches 113 and 114 supply electrical current energizing the bifurcated air solenoid 112. In this instance, air is supplied to the confection dispensing air regulators 103 by means of one leg 112b of the bifurcated air solenoid 112 being open to the passage of air while at the same instant, the second leg 112g of the bifurcated air solenoid 112 is closed to the passage of air.

The confection dispensing air regulators 109, 103 in turn supply air to the pistons 60 in the closed compartments via the open air-piloted air switches 102. In this instance, the system is operational and the closed compartments 28 are pressurized.

In the event the venting system described above fails to vent pressure from the receptacle 28 then the safety latch as shown in FIG. 5B operates to fully vent the appropriate dispensing assembly 15 and to prevent any upward movement of the lid 32.

In the second condition for inspecting or removal of a container 22 with the door 14 to the frozen confection dispensing apparatus 10 opened, the electrical switch 113 opens and electrical current no longer flows to the bifurcated air solenoid 112. Toggle switch 114 which is in series with switch 113 is moved by the operator to an open position for protection of an accidental closing of switch 113 which in turn would re-pressurize the receptacles 28. Opening switches 113 and/or 114 causes the bifurcated air solenoid high pressure air supply to shift from one leg 112b of the bifurcated air solenoid 112 as in the first condition, to the second leg 112g of the bifurcated air solenoid 112. Additionally, the high pressure air contained in the leg 112b of the bifurcated air solenoid 112 in the first instance and the air system comprising all of the parts up to the air piloted air switch 102 but not including the air piloted air switch 102, will in the second instance be vented to atmosphere through an exhaust port 112k situated within the air system of the first instance and located on the bifurcated air solenoid 112.

In the second condition, the high pressure air supply open through the second leg 112g of the bifurcated air solenoid 112 actuates the air piloted air switches 102 to a closed position. This action causes the air piloted air switches 102 to switch, which causes the high pressure air on pistons 60 to vent to atmosphere through the port 102d which will be in alignment with air port 102a through air passageway 102e in the air piloted air switches 102. At this time the air system has been vented to atmospheric pressure and the closed compartment containing the collapsible container 22 is safe to open, that is, pressure lid 32 can be lifted for removal of collapsible container 22 or inspection of the machine.

Although the invention has been described in detail with reference to specific preferred embodiments and specific examples, variation and modifications exist within the scope and spirit of the invention as described in the following claims.

What is claimed is:

1. A frozen dessert dispensing apparatus for dispensing frozen dessert comprising:

a collapsible container holding said frozen dessert;

means for receiving said collapsible container having said frozen dessert, said collapsible container having a formed opening for dispensing said frozen dessert therefrom;

a lid connected to said receiving means for sealing said receiving means when said collapsible container is received therein;

a dispensing valve means connected to said receiving means and in flow communication with said at least one formed opening;

air pressure means connected to said receiving means for collapsing said collapsible container in response to operation of said dispensing valve means;

a safety latch means connected to said lid and to said receiving means for preventing removal of said collapsible container from said receiving means when said collapsible container is under air pressure in said receiving means, said safety latch means when operated preventing said lid from being lifted away from said receiving means when said collapsible container is under said air pressure in said receiving means, said safety latch means when operated allowing said lid to move upwardly under said air pressure to an intermediate position venting any remaining air pressure from said receiving means before said lid can be lifted away and said collapsible container removed.

2. The apparatus of claim 1 wherein said air pressure means includes an air actuated piston and a solenoid valve in flow communication with said air actuated piston, said air actuated piston being in contacting relation with said collapsible bag in said receiving means.

3. The apparatus of claim 1 further comprising a housing enclosing said receiving means, said housing having a door, wherein said air pressure means includes a solenoid valve, and further comprising: an electrical door switch operable in response to opening and closing said door of said apparatus, said electrical door switch being in series in an electrical circuit with said solenoid valve.

4. The apparatus of claim 3 wherein said solenoid valve is in a closed position when de-energized and said electrical door switch is in an open position when said door is open.

5. The apparatus of claim 1 wherein said dispensing valve means including a spigot having an inlet in flow communication with said formed opening in said collapsible container, said spigot including a movable plunger therein, said moveable plunger blocking said inlet in at least one position and non-blocking said inlet in at least a second position, said plunger being attached to and operable in response to a movable handle, said movable handle being in actuating relation with said air pressure means.

6. The apparatus claim 5 wherein said air pressure means includes an air pressure source and an air regulator to regulate air pressure from said air pressure source, said movable handle being in actuating relation with said air regulator.

7. A frozen dessert dispensing apparatus comprising:

a housing having means to receive at least one collapsible container for a frozen dessert, said container having at least one opening for dispensing frozen dessert therefrom;

a dispensing valve means in flow communication with said at least one opening, said dispensing valve means including a spigot having an inlet in flow communication with said at least one opening in said collapsible container in an outlet, said spigot including a movable plunger therein, said movable plunger blocking said inlet in at least one position and non-blocking said inlet in at least a second position, said plunger being attached to and operable in response to a movable handle, said movable handle being in actuating relation with said air pressure means;

air pressure means to collapse said at least one collapsible container in response to operation of said valve means, said air pressure means including an air pressure source and an air regulator to regulate pressure from said air pressure source, said handle being in actuating relation with said air regulator;

said dispensing valve means including a spigot having an inlet in flow communication with said formed opening in said collapsible container , said spigot including a movable plunger therein, said moveable plunger blocking said inlet in at least one position and non-blocking said inlet in at least a second position, said plunger being attached to and operable in response to a movable handle, said movable handle being in actuating relation with said air pressure means, said air pressure means includes an air pressure source and an air regulator to regulate air pressure from said air pressure source, said movable handle being in actuating relation with said air regulator.

a push rod attached to a sloped cam, said movable handle being attached to said push rod for movement of said push rod and said sloped cam, said sloped cam being in contacting relation with said air regulator, said sloped cam with said regulator, regulating the pressure of air through said air regulator; and means to prevent removal of said collapsible container until all pressure on said collapsible container is depleted.

8. A frozen dessert dispensing apparatus comprising:

a housing having means to receive at least one collapsible container for a frozen dessert, said container having at least one opening for dispensing frozen dessert therefrom;

a dispensing valve means in flow communication with said at least one opening;

air pressure means to collapse said at least one collapsible container in response to operation of said valve means;

means to prevent removal of said collapsible container until all pressure on said collapsible container is depleted; and a safety latch means for said means to receive at least one collapsible container, said safety latch means preventing removal of said collapsible container if said container is under pressure, said safety latch means including a safety latch assembly comprising a pair of plate members extending outwardly from a pressure lid assembly on said means to receive at least one collapsible container, said plate members having aligned upper grooves and aligned lower grooves, said grooves being sized to receive a latch pin therein, said lower groove having a depth greater than said upper groove, said latch pin being attached to a moveable handle, said moveable handle being positioned so that when the pin is in either the lower groove or the upper groove the pressure lid assembly is held in place.

9. A frozen dessert dispensing apparatus for dispensing frozen dessert comprising:

a housing having at least one door, a collapsible container holding said frozen dessert, a receptacle in said housing for receiving said collapsible container holding said frozen dessert, said collapsible container having a formed opening for dispensing said frozen dessert therefrom, a lid connected to said receptacle for sealing said receptacle when said collapsible container is received therein, a dispensing valve connected to said receptacle and in flow communication with said formed opening, air pressure means connected to said receptacle for collapsing said collapsible container in response to the operation of said dispensing valve, means connected to said air pressure means for deactuating said air pressure means when said door of said housing is opened, said deactuating means engaging said door, a safety latch assembly connected to said lid and to said receptacle for preventing removal of said collapsible container from said receptacle when said collapsible container is under air pressure in said receptacle, said safety latch assembly when operated preventing said lid from being lifted away from said receptacle when said collapsible container is under said air pressure in said receptacle, said safety latch assembly when operated allowing said lid to move upwardly under said air pressure to an intermediate position venting any remaining air pressure from said receptacle before said lid can be lifted away and said collapsible container can be removed from said receptacle.

* * * * *